(12) United States Patent
Zhang et al.

(10) Patent No.: US 10,897,508 B2
(45) Date of Patent: Jan. 19, 2021

(54) PERSONAL CALL CENTER ASSISTANT

(71) Applicant: International Business Machines Corporation, Armonk, NY (US)

(72) Inventors: Yin Jun Zhang, Ningbo (CN); Tao Liu, Dublin, OH (US); Qiang He, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/297,283

(22) Filed: Mar. 8, 2019

(65) Prior Publication Data
US 2020/0287973 A1    Sep. 10, 2020

(51) Int. Cl.
| | | |
|---|---|---|
| *H04L 29/08* | (2006.01) | |
| *G10L 15/26* | (2006.01) | |
| *G10L 15/22* | (2006.01) | |
| *G06N 5/04* | (2006.01) | |
| *H04L 29/06* | (2006.01) | |
| *G06F 16/27* | (2019.01) | |

(52) U.S. Cl.
CPC ............ *H04L 67/141* (2013.01); *G06F 16/27* (2019.01); *G06N 5/04* (2013.01); *G10L 15/22* (2013.01); *G10L 15/26* (2013.01); *H04L 63/102* (2013.01); *G10L 2015/223* (2013.01)

(58) Field of Classification Search
CPC ..... H04L 67/141; H04L 63/102; G10L 15/22; G10L 2015/223; G10L 15/265; G10L 15/26; G06F 16/27; G06N 5/04
See application file for complete search history.

(56) References Cited

U.S. PATENT DOCUMENTS

| | | | |
|---|---|---|---|
| 6,385,662 B1 | 5/2002 | Moon et al. | |
| 6,567,805 B1 * | 5/2003 | Johnson | .................. G06F 16/30 707/740 |
| 7,606,714 B2 | 10/2009 | Williams et al. | |
| 9,214,001 B2 | 12/2015 | Rawle | |

(Continued)

OTHER PUBLICATIONS

Sarikaya, "The Technology Behind Personal Digital Assistants", Jan. 2017, IEEE Signal Processing Magazine, 15 pages. (Year: 2017).*

(Continued)

*Primary Examiner* — Arvin Eskandarnia
*Assistant Examiner* — Chhian (Amy) Ling
(74) *Attorney, Agent, or Firm* — Kunzler Bean & Adamson; Bruce R. Needham

(57) ABSTRACT

An apparatus for a personal call center assistant includes a receiver that receives a query from a call center over a communication channel during a communication session between the call center and a user. A security checker that determines whether text from the query matches an entry in a user profile of the user and an inference engine identifies one or more query responses in response to the security checker determining that the text from the query matches an entry in the user profile. Each query response is assigned a confidence level and each confidence level includes a likelihood that the query response matches information requested in the query. An outputter converts a query response with a highest confidence level to an answer to the query and a responder communicates the answer to the query to the call center in a format compatible with the query.

20 Claims, 6 Drawing Sheets

(56) References Cited

U.S. PATENT DOCUMENTS

| | | |
|---|---|---|
| 2004/0190687 A1 | 9/2004 | Baker |
| 2005/0105712 A1 | 5/2005 | Williams et al. |
| 2008/0195659 A1 | 8/2008 | Rawle |
| 2009/0125499 A1* | 5/2009 | Cross .................... H04L 67/306 |
| 2012/0117541 A1* | 5/2012 | Bates ........................ G06F 8/71 |
| | | 717/125 |
| 2013/0152092 A1 | 6/2013 | Yadgar |
| 2014/0297288 A1 | 10/2014 | Yu et al. |
| 2014/0314225 A1 | 10/2014 | Riahi et al. |
| 2015/0301796 A1* | 10/2015 | Visser ..................... G10L 15/22 |
| | | 715/728 |
| 2015/0302003 A1 | 10/2015 | Yadgar et al. |
| 2017/0006161 A9 | 1/2017 | Riahi et al. |
| 2017/0032027 A1 | 2/2017 | Mauro et al. |
| 2018/0063326 A1* | 3/2018 | Tichauer ............. H04M 3/4936 |
| 2018/0322403 A1* | 11/2018 | Ron ........................ H04L 51/16 |

OTHER PUBLICATIONS

Robert Stanley, "A Comprehensive History of AI in the Call Center: From ACDs to Predictive Analytics and Beyond", Engagement Optimization, Mar. 27, 2018, pp. 1-10.

Thomas Soulez, "How Artificial Intelligence in the Contact Center Will Work", Nexmo, Mar. 29, 2017, pp. 1-6.

Ashley Smith, "Three Ways Artificial Intelligence Will Improve Call Center Customer Service", Kunnect, Oct. 18, 2016, pp. 1-3.

* cited by examiner

PERSONAL CALL CENTER ASSISTANT

BACKGROUND

The subject matter disclosed herein relates to communication with a call center and more particularly relates to using a personal call center assistant to assist in communicating with a call center.

Consumers often communicate with a call center in the form of a phone call or a chat session. Often the call or chat session is initiated through an application running on a portable electronic device or other computing device. Typically, a user interacts with the call center and at some point the call center requires personal information from the consumer, such as a credit card number, an identification number, an address, a phone number, an email address, etc. Providing this personal information is often repetitive and time consuming and the consumer may want to be doing something else rather than providing the personal information.

SUMMARY

An apparatus for a personal call center assistant is disclosed. A computer-implemented method and computer program product also perform the functions of the apparatus. According to an embodiment of the present invention, the apparatus includes a receiver that receives a query from a call center over a communication channel during a communication session between the call center and a user. The query is directed to receiving information from the user during the communication session. The apparatus includes a security checker that determines whether text from the query matches an entry in a user profile of the user and an inference engine that identifies one or more query responses in response to the security checker determining that the text from the query matches an entry in the user profile. Each query response is assigned a confidence level and each confidence level includes a likelihood that the query response matches information requested in the query. The apparatus includes an outputter that converts a query response with a highest confidence level to an answer to the query and a responder that communicates the answer to the query to the call center in a format compatible with the query.

A computer-implemented method for a personal call center assistant includes receiving a query from a call center over a communication channel during a communication session between the call center and a user. The query is directed to receiving information from the user during the communication session. The computer-implemented method includes determining whether text from the query matches an entry in a user profile of the user and identifying one or more query responses in response to determining that the text from the query matches an entry in the user profile. Each query response is assigned a confidence level and each confidence level includes a likelihood that the query response matches information requested in the query. The computer-implemented method includes converting a query response with a highest confidence level to an answer to the query and communicating the answer to the query to the call center in a format compatible with the query.

A computer program product for a personal call center assistant includes a computer readable storage medium having program instructions embodied therewith. The program instructions are executable by a processor to cause the processor to receive a query from a call center over a communication channel during a communication session between the call center and a user, where the query is directed to receiving information from the user during the communication session, and to determine whether text from the query matches an entry in a user profile of the user. The program instructions are executable by a processor to identify one or more query responses in response to determining that the text from the query matches an entry in the user profile. Each query response is assigned a confidence level and each confidence level includes a likelihood that the query response matches information requested in the query. The program instructions are executable by a processor to convert a query response with a highest confidence level to an answer to the query, and to communicate the answer to the query to the call center in a format compatible with the query.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
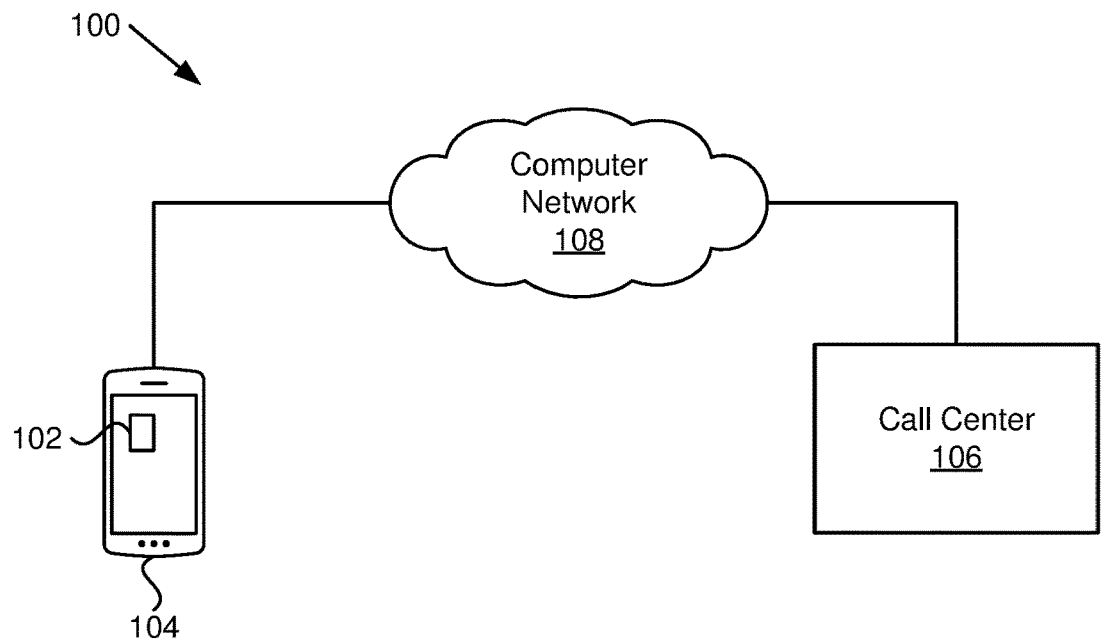
FIG. 1A is a schematic block diagram illustrating one embodiment of a system for a personal call center assistant with a portable electronic device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a component, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as components, in order to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Components may also be implemented in software for execution by various types of processors. An identified component of program instructions may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Furthermore, the described features, structures, or characteristics of the embodiments may be combined in any suitable manner. In the following description, numerous specific details are provided, such as examples of programming, software components, user selections, network transactions, database queries, database structures, hardware components, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

An apparatus for a personal call center assistant is disclosed. A computer-implemented method and computer program product also perform the functions of the apparatus. According to an embodiment of the present invention, the apparatus includes a receiver that receives a query from a call center over a communication channel during a communication session between the call center and a user. The query is directed to receiving information from the user during the communication session. The apparatus includes a security checker that determines whether text from the query matches an entry in a user profile of the user and an inference engine that identifies one or more query responses in response to the security checker determining that the text from the query matches an entry in the user profile. Each query response is assigned a confidence level and each confidence level includes a likelihood that the query response matches information requested in the query. The apparatus includes an outputter that converts a query response with a highest confidence level to an answer to the query and a responder that communicates the answer to the query to the call center in a format compatible with the query.

In some embodiments, the apparatus includes a notifier that prompts the user to respond to the query in response to the security checker determining that text from the query does not match an entry in the user profile. In other embodiments, the security checker further determines if each of the one or more query responses is authorized and the outputter converts a query response with a highest confidence level and that is authorized to an answer to the query. In other embodiments, the apparatus includes a notifier that prompts the user to respond to the query in response to the security checker determining that a query response with a highest confidence level is not authorized. In other embodiments, the apparatus includes a notifier that prompts the user to respond to the query in response to the confidence level for each of the one or more query responses being below a confidence threshold and/or the confidence level for two or more query responses being equal and being higher than the confidence level of other query responses.

In some embodiments, the communication session is a phone call and the query is communicated to the receiver as a voice query and the receiver converts the voice query to text and the outputter converts the query response to an answer that is a voice answer. In other embodiments, the communication session is a chat session and the query is communicated to the receiver as a text query and the outputter converts the query response to an answer that is a text answer. In other embodiments, the apparatus includes a learning engine that stores information from the communication session and uses machine learning to use information from one or more past communication sessions to identify a call center participating in the communication session, to update the user profile and/or to determine whether a query response is authorized by the user.

In some embodiments, the query received from the receiver is in an unstructured format and the apparatus includes an inputter that extracts key words from the query and formats the query into structured text compatible with the security checker searching the user profile for the structured text to determine if the text from the query matches an entry in the user profile. In other embodiments, the apparatus includes a call initializer that initiates the communication session with the call center using a call center identifier. The call center identifier includes a phone number of the call center, a chat channel identifier used to initiate a chat session with the call center and/or an application identifier where the user initiates the communication session through an application associated with the application identifier and the application identifies the call center. In other embodiments, the query requests personal information from the user and the answer to the query includes personal information requested in the query.

A computer-implemented method for a personal call center assistant includes receiving a query from a call center over a communication channel during a communication session between the call center and a user. The query is directed to receiving information from the user during the communication session. The computer-implemented method includes determining whether text from the query matches an entry in a user profile of the user and identifying one or more query responses in response to determining that the text from the query matches an entry in the user profile. Each query response is assigned a confidence level and each confidence level includes a likelihood that the query response matches information requested in the query. The computer-implemented method includes converting a query response with a highest confidence level to an answer to the query and communicating the answer to the query to the call center in a format compatible with the query.

In some embodiments, the computer-implemented method includes prompting the user to respond to the query in response to determining that text from the query does not match an entry in the user profile. In other embodiments, the computer-implemented method includes determining if each of the one or more query responses is authorized and converting a query response with a highest confidence level to an answer to the query includes converting a query response with a highest confidence level and that is authorized to an answer to the query.

In some embodiments, the computer-implemented method includes prompting the user to respond to the query in response to determining that a query response with a highest confidence level is not authorized. In other embodiments, the computer-implemented method includes prompting the user to respond to the query in response to determining that a query response with a highest confidence level is not authorized. In other embodiments, the computer-implemented method includes prompting the user to respond to the query in response to the confidence level for each of the one or more query responses being below a confidence threshold and/or the confidence level for two or more query responses being equal and being higher than the confidence level of other query responses.

In some embodiments, the communication session is a phone call and the query is communicated as a voice query and the computer-implemented method includes converting the voice query to text and converting the query response to an answer that is a voice answer. In other embodiments, the communication session is a chat session and the query is communicated as a text query and computer-implemented method includes converting the query response to an answer that is a text answer. In other embodiments, the computer-implemented method includes storing information from the communication session and using machine learning to use information from one or more past communication sessions to identify a call center participating in the communication session, to update the user profile and/or to determine whether a query response is authorized by the user.

A computer program product for a personal call center assistant includes a computer readable storage medium having program instructions embodied therewith. The program instructions are executable by a processor to cause the processor to receive a query from a call center over a communication channel during a communication session between the call center and a user, where the query is directed to receiving information from the user during the communication session, and to determine whether text from the query matches an entry in a user profile of the user. The program instructions are executable by a processor to identify one or more query responses in response to determining that the text from the query matches an entry in the user profile. Each query response is assigned a confidence level and each confidence level includes a likelihood that the query response matches information requested in the query. The program instructions are executable by a processor to convert a query response with a highest confidence level to an answer to the query, and to communicate the answer to the query to the call center in a format compatible with the query.

FIG. 1A is a schematic block diagram illustrating one embodiment of a system 100 for a personal call center assistant 102 with a portable electronic device 104. The system 100 includes a personal call center assistant 102 in a portable electronic device 104, a call center 106, and a computer network 108, which are described below.

The system 100 includes a portable electronic device 104 capable of using the personal call center assistant 102. The portable electronic device 104 may be a smartphone, a smartwatch, a tablet, a laptop computer, etc. capable of using a personal call center assistant 102. For example, the portable electronic device 104 may include a processor and memory to store and execute code of the personal call center assistant 102. In other embodiments, the portable electronic device 104 includes an FPGA and/or hardware circuits embodying the personal call center assistant 102. One of skill in the art will recognize other portable electronic devices 104 capable of using the personal call center assistant 102.

The personal call center assistant 102 communicates through the portable electronic device 104 with a call center 106 over a computer network 108. The call center 106 may communicate using voice communications, such as during a phone call, or by text communications, during a chat session. The call center 106 includes financial institutions, ticketing agencies, airlines, retailers, medical professionals, government offices, or any other entity that communicates by voice or text and requires a user (customer, client, consumer, etc.) to provide personal information. The personal call center assistant 102 interacts with the call center 106 to provide information to the call center 106 in place of a user providing the information.

The computer network 108, in one embodiment, includes a digital communication network that transmits digital communications. The computer network 108 may include a wireless network, such as a wireless cellular network, a local wireless network, such as a Wi-Fi network, a Bluetooth® network, a near-field communication ("NFC") network, an ad hoc network, and/or the like. The computer network 108 may include a wide area network ("WAN"), a storage area network ("SAN"), a local area network (LAN), an optical fiber network, the internet, or other digital communication network. The computer network 108 may include two or more networks. The computer network 108 may include one or more servers, routers, switches, and/or other networking equipment. The computer network 108 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 1B:
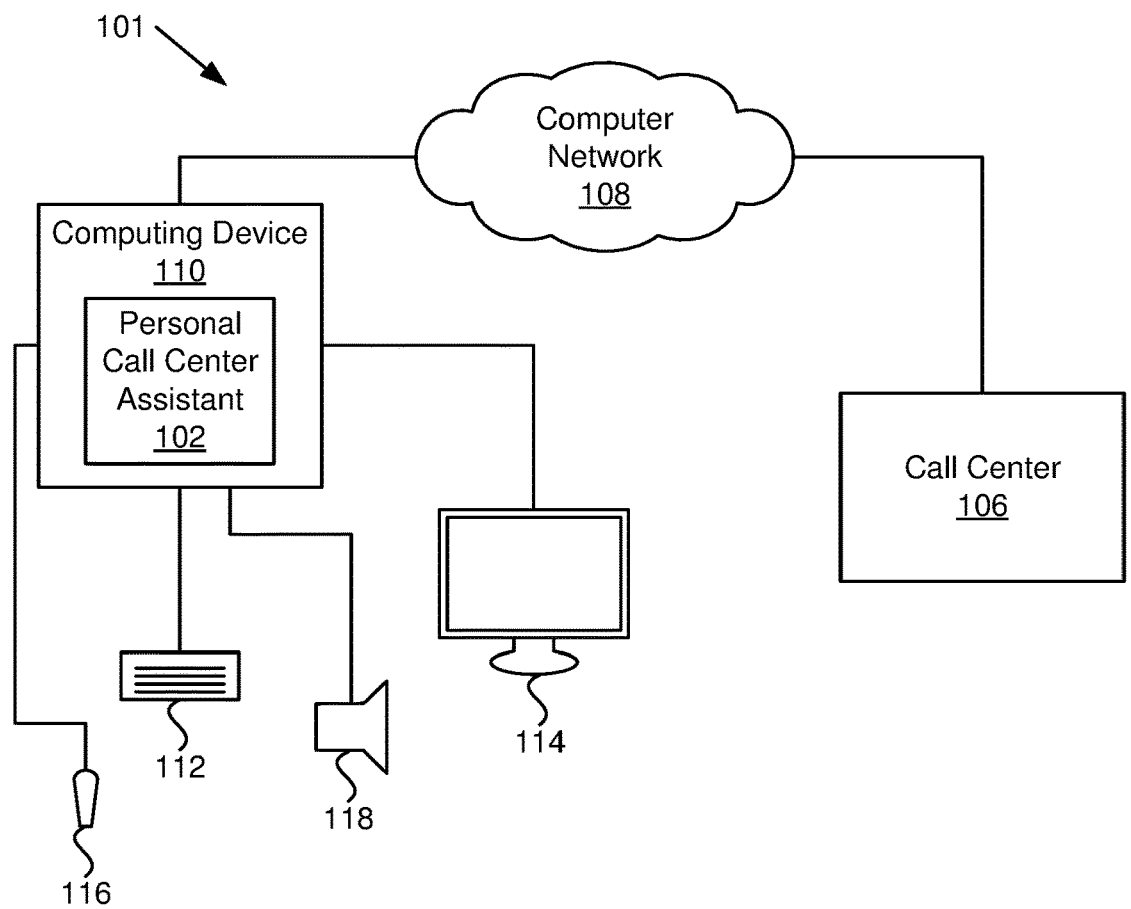
FIG. 1B is a schematic block diagram illustrating one embodiment of a system for a personal call center assistant with a computing device.

FIG. 1B is a schematic block diagram illustrating one embodiment of a system 101 for a personal call center assistant 102 with a computing device 110. The system 101 includes a personal call center assistant 102 in a computing device 110, a call center 106, and a computer network 108, a keyboard 112, a monitor 114, a microphone 116, and a speaker 118, which are described below.

The system 101 is similar to the system 100 of FIG. 1A except that the personal call center assistant 102 is instead included in a computing device 110 with a keyboard 112, monitor 114, microphone 116, speaker 118, or other user interface. The call center 106 and the computer network 108 are substantially similar to those described above with regard to the system 100 of FIG. 1A. The computing device 110 may be a desktop computer, a workstation, a client connected to a server, or other computing device capable of using the personal call center assistant 102. The keyboard 112, monitor 114, microphone 116, speaker 118, or other user interfaces may be separate or built into the computing device 110.

In some embodiments, the personal call center assistant 102 for the systems 100, 101 of FIGS. 1A and 1B interact with a server (not shown) and at least a portion of the personal call center assistant 102 execute on the server. In other embodiments, the personal call center assistant 102 is installed in the portable electronic device 104 and/or computing device 110. One of skill in the art will recognize other ways to use a personal call center assistant 102.

Figure 2:
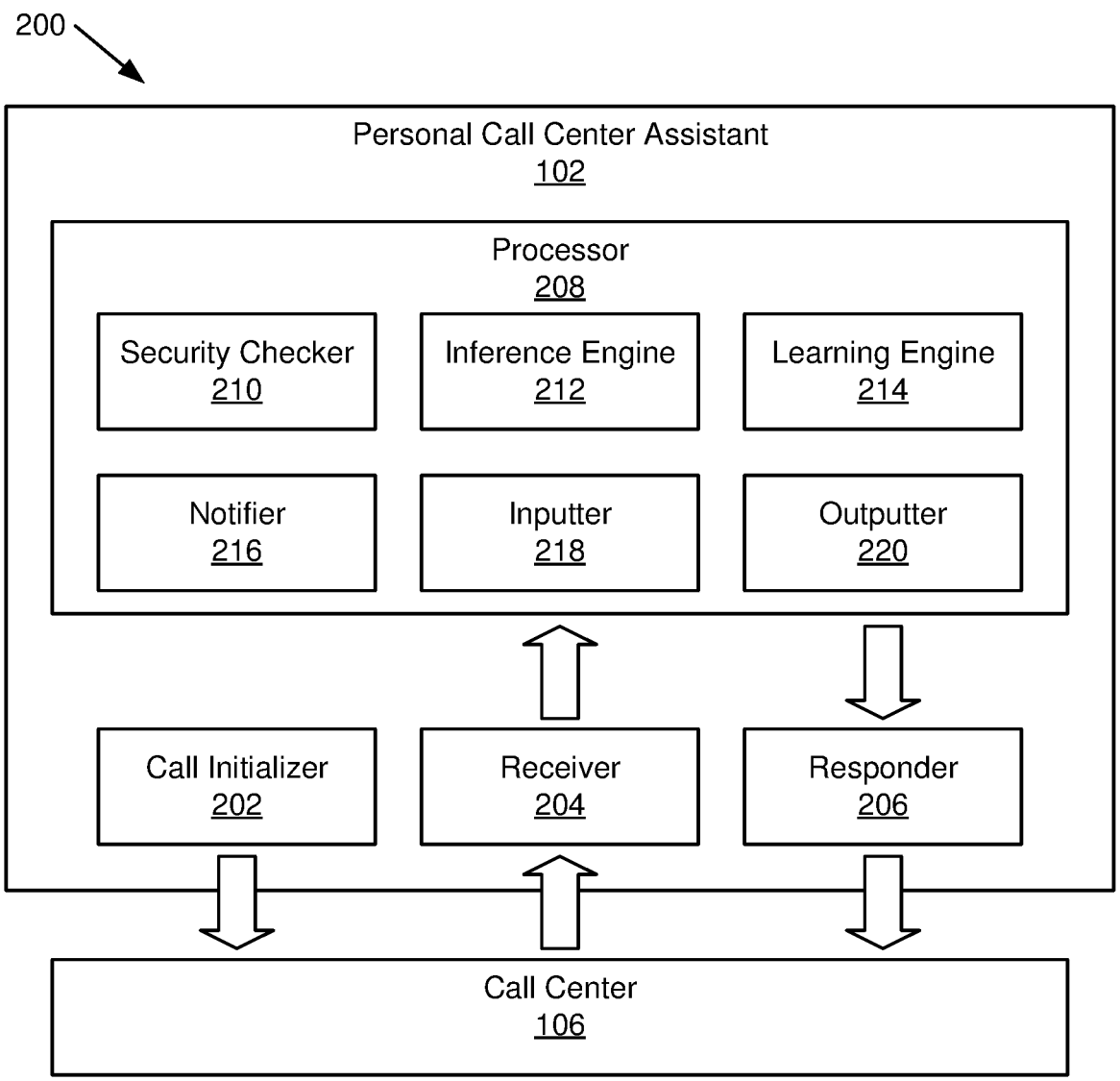
FIG. 2 is a schematic block diagram illustrating one embodiment of a personal call center assistant apparatus.

FIG. 2 is a schematic block diagram illustrating one embodiment of a personal call center assistant apparatus 200. The personal call center assistant apparatus 200 includes one embodiment of a personal call center assistant 102 that includes a call initializer 202, a receiver 204, a responder 206 and a processor 208 with a security checker 210, an inference engine 212, a learning engine 214, a notifier 216, an inputter 218, an outputter 220 and a responder 206, which are described below. Arrows in FIG. 2 indicate general data flow.

The personal call center assistant apparatus 200 includes a call initializer 202 that receives input from a user when the user calls a call center 106. For example, the input may be a phone number of the call center 106 when the call center communicates over a voice channel. In other embodiments, the input may be a selection of a call initializer 202 that is a chat interface, a web site address, or other digital communication input to open a text channel with the call center 106. For example, an application running on the portable electronic device 104 and/or computing device 110 may include a selection for opening a chat session with the call center 106. In other embodiments, the user may enter a web address through the call initializer 202 to access the call center 106 without accessing an application.

In some embodiments, the call initializer 202 triggers use of the personal call center assistant 102 after the user has communicated with the call center for a period of time. For example, the call center 106 may be for a retailer and the user may contact the call center 106 to place an order. After placing the order, the call center 106 wants personal information from the user, such as a credit card number, a shipping address, a mailing address, and the like. The user then initiates use of the personal call center assistant 102 to provide the information requested by the call center 106 so that the user can do something else. For example, the user may select, execute, etc. an application associated with the personal call center assistant 102 to activate the call initializer 202 to being interaction between the personal call center assistant 102 and the call center 106. In other embodiments, at least a portion of the personal call center assistant 102 is running and detects the user speaking a keyword, typing the keyword, etc. to activate the personal call center assistant 102. One of skill in the art will recognize other ways that a user can activate the personal call center assistant 102 during a communication session with a call center 106.

The call initializer 202, in some embodiments, includes hardware circuits for connecting to the call center 106 and for receiving input from the user. In other embodiments, the call initializer 202 is a software component that enables a user to connect with the call center 106. In some embodiments, the personal call center assistant 102 stores contact information of the call center 106 as part of recording a communication session with the call center 106. The contact information may be used by the personal call center assistant 102 to reconnect with the call center 106, to identify the call center 106, for authorization of information passed to the call center 106, and the like and may be part of a context for the communication session.

The receiver 204 receives a query from the call center 106 where the query is in a voice format over a voice channel or is in a text format over a data channel. The receiver 204, in some embodiments, includes hardware for communicating with the call center 106 and processor 208. In other embodiments, the receiver 204 includes software that interfaces with hardware elements that enable communication with the call center 106 and/or processor 208. In some embodiments, the receiver 204 includes a detector to detect either voice or text communication from the call center 106. In some embodiments, where a query from the call center 106 is over a voice channel, the receiver 204 converts the query to a text format. In some embodiments, the receiver 204 converts the query into an unstructured text format that includes words of the query in an order as the words were spoken by the call center 106. Where the query is over a text channel, the receiver 204, in some embodiments, receives the text query in an unstructured format as words as they came from the call center 106.

In some embodiments, the personal call center assistant apparatus 200 includes a security checker 210 that validates if the call center 106 is authentic. For example, the security checker 210 may communicate with the call center 106 to exchange a password, may verify that a phone number of the call center 106 matches a stored phone number for the call center 106, etc. In other embodiments, the security checker 210 determines whether text from the query matches an entry in a user profile of the user. For example, text from the query may include "ID card number" and the user profile may or may not include a field titled "ID card number."

In some embodiments, the security checker 210 verifies that personal information in a query response is authorized for sending to the call center 106. For example, the user profile may include a field of "ID card number" paired with a number of 123654 and also paired with a bank call center with a phone number of 555-123-4567 but the call center 106 asking for the ID card number may be a credit card vendor with a different phone number of 555-765-4321 so the security checker 210 may decline authorization to send the number 123654 to the call center 106. In other embodiments, the security checker 210 invokes the notifier 216 to notify the user that the call center 106 is seeking particular information and obtains approval from the user before authorizing communicating the information to the call center 106. One of skill in the art will recognize other ways for the security checker 210 to authorize or decline communicating information from the user profile to the call center 106.

In some embodiments, the personal call center assistant apparatus 200 includes an inference engine 212 that identifies one or more query responses in response to the security checker 210 determining that the text from the query matches an entry in the user profile. The inference engine 212, in some embodiments, assigns each query response a confidence level where each confidence level includes a likelihood that the query response matches information requested in the query. For example, key words from the query may be ID card number and the user profile may include several possible fits for the key words.

For example, the user profile may include an "ID number," an "identification number," an "ID card" and an "ID card number." In the example, the inference engine 212 may assign "ID card number" a confidence level of 100, for "ID number" a confidence level of 75, for "ID card" a confidence level of 75 and for "identification number" a confidence level of 55. In some embodiments, the inference engine 212 outputs the query response associated with "ID card number" because "ID card number" has the highest confidence level of all of the possible query responses identified by the inference engine 212.

In some embodiments, the inference engine 212 uses an algorithm that considers each key word in an entry of the user profile as well as synonyms of the key words. For example, where the entry includes "ID," the inference engine 212 assigns a higher score for a direct match of "ID" while assigning a lower score for "identification." The algorithm assigns a higher score where all key words of an entry are in the text of the query and a lower score where some of the key words are in the text of the query. The algorithm of the inference engine 212, in some embodiments, creates a total score for each possible query response where the total score is the confidence level. In other embodiments, the inference engine 212 normalizes scores for possible query responses. In some embodiments, the inference engine 212 uses an algorithm similar to search engines for internet browsers and other computer search engines to determine a confidence level for each possible query response. One of skill in the art will recognize algorithms appropriate for the inference engine 212 to determine a confidence level for each possible query response.

In some embodiments, the personal call center assistant apparatus 200 includes a learning engine 214 that stores information from the communication session and uses machine learning to use information from one or more past communication sessions to identify a call center 106 participating in the communication session, to update the user profile, to determine whether a query response is authorized by the user, and the like. In some embodiments, the learning engine 214 is a repository for the user profile, for information from communication sessions, and the like. In other embodiments, the learning engine 214 accesses information stored elsewhere.

In some embodiments, the learning engine 214 includes one or more machine learning algorithms that use information from communication sessions with call centers 106 to populate certain fields in the user profile for future communication sessions with a call center 106. For example, if a query asks for an airline ID number for a particular airline and the airline ID number is not stored in the user profile, the user may respond with the airline ID number for the airline and the learning engine 214 may then store the airline ID number in the user profile and associate the airline ID number with the particular airline. For example, the learning engine 214 may identify the particular airline using a phone number, website, etc. used to connect with the airline call center. In other embodiments, the learning engine 214 stores a user profile entry and associated query response in the user profile along with a flag that alerts the security checker 210 to require user approval before the query response is authorized for communication to a call center 106. One of skill in the art will recognize other ways for the learning engine 214 to identify user profile entries, associated query responses, conditions for authorization, etc. from communication sessions.

In some embodiments, the personal call center assistant apparatus 200 includes a notifier 216 that prompts the user to respond to a query in response to the security checker 210 determining that text from the query does not match an entry in the user profile. In some embodiments, the notifier 216 prompts the user to respond to the query in response to the security checker 210 determining that a query response with a highest confidence level is not authorized. In other embodiments, the notifier 216 prompts the user to respond to the query in response to the confidence level for each of the one or more query responses being below a confidence threshold. For example, a range for confidence levels may be 0-100 and the confidence threshold may be 80 or other number between 0 and 100.

In other embodiments, the notifier 216 prompts the user to respond to the query in response to the confidence level for two or more query responses being equal and being higher than the confidence level of other query responses. In other embodiments, the notifier 216 prompts the user to respond to the query in response to the confidence level for two or more query responses being equal and being higher than the confidence level of other query responses and the two responses being above the confidence threshold. In some embodiments, the notifier 216 presents one or more query responses to the user as possible selections to provide to the call center 106.

In other embodiments, the notifier 216 prompts the user to respond where the receiver 204 does not recognize words from the query. In other embodiments, the notifier 216 prompts the user to respond for queries and other communications from the call center 106 that do not have key words that match words in the user profile. For example, the call center 106 may ask "What credit card do you want to use?". The question does not reference a particular credit card so the notifier 216 prompts the user to select a credit card. For example, the user may have credit cards from brand A and brand B and may select brand A. In one embodiment, the user provides the brand A credit card number to the call center 106. In another embodiment, the user notifies the personal call center assistant 102 that brand A is the chosen credit card and the personal call center assistant 102 then takes over to select the brand A credit card and to provide a query response containing the brand A credit card number. One of skill in the art will recognize other times for the notifier 216 to prompt the user to interact directly with the call center 106.

Where the user provides information directly to the call center 106, the learning engine 214, in some embodiments, gleans information from the information. For example, if the user provides a credit card number to the call center 106, the learning engine 214 extracts the card name (i.e. brand C), credit card number, expiration date, security number, etc. from the user's speech or typing and inputs the brand C credit card information into the user profile. In another example, where the user selects a credit card for use, the learning engine 214 marks the credit card as a preferred credit card. In other embodiments, the learning engine 214 interacts with the user to confirm that the information extracted from the user's communication with the call center 106 is correct, that the user's preferences are correct, etc.

before finalizing storage of the information in the user profile. One of skill in the art will recognize other ways that the learning engine 214 can extract information from communications between the user and call center 106 and can interact with the user to verify that the information is correct and is to be saved in the user profile.

In some embodiments, the personal call center assistant apparatus 200 includes an inputter 218 that extracts structured data from the unstructured query and formats the query into structured text compatible with the security checker 210 searching a user profile of the user for structured text to determine if the text from the query matches an entry in the user profile. The inputter 218, in some embodiments, extracts key words from the query. For example, where the query is "What is your ID card number?", the inputter 218, may extract "ID card number" from the query and put "ID card number" into a data structure for submission to a search engine of the security checker 210.

In some embodiments, the inputter 218 may also interpret the query from the call center 106 to determine a context of the query. For example, the question "What is your ID card number?" may be interpreted as a question seeking particular information while the question "What card do you want to use?" may be interpreted as a question seeking a selection, while a communication of "Thank you for your purchase" may be interpreted by the inputter 218 as a statement that does not require a response, requires a response that is customary for the culture of the user, such as "You're welcome." The personal call center assistant 102, in some embodiments, is capable of responding to a wide variety of communications from the call center 106 that are not direct inquiries for personal information of the user and may use various components of the personal call center assistant apparatus 200.

In some embodiments, the personal call center assistant apparatus 200 includes an outputter 220 that converts a query response with a highest confidence level to an answer to the query. For example, the query response may be a number, a word, a combination of words and numbers, and the like and the outputter 220 inputs information from the query response into one or more sentences to form an answer to the query. For instance, if the query is "What is your ID card number?" and the query response is 123654, the outputter 220, in one embodiment, responds with an answer that is "My ID card number is 123654." Where the communication session is a chat session, the outputter 220 creates and answer in a text format. Where the communication session is a phone call, in some embodiments, the outputter 220 then takes an additional step of converting the answer in the form of a text into a voice answer.

In some embodiments, the outputter 220 adds additional words within the context of the communication session. For example, where the personal call center assistant 102 has provided a credit card number, an expiration date, a name on the card, a security code, etc., the outputter 220 may conclude that the information provided for a purchase is complete and may then create a response of "Is there any other information needed?" and may continue creating responses to statements from the call center 106 that are in line with the context of the communication session and to conclude the communication session, such as "Thank you, goodbye," or something similar. In other embodiments, the notifier 216 prompts the user to take over communication with the call center 106 to end the communication session.

In some embodiments, the personal call center assistant apparatus 200 includes a responder 206 that communicates the answer to the query to the call center in a format compatible with the query. For example, where the communication session is a phone call, the responder 206 connects with a speaker to output the answer to the query in a voice format. Where the communication session is a chat session, the responder 206 outputs the answer as text over a digital communication line.

In the embodiment depicted in FIG. 2, the security checker 210, the inference engine 212, the learning engine 214, the notifier 216, the inputter 218 and the outputter 220 are depicted in a processor 208 and may be software components in the form of executable code stored on one or more computer readable storage media. In other embodiments, all or portions of the security checker 210, the inference engine 212, the learning engine 214, the notifier 216, the inputter 218 and/or the outputter 220 are components implemented in hardware circuits. For example, all or portions of the components may be implemented in an application specific integrated circuit ("ASIC"). In other embodiments, all or a portion of the components may be implemented in a programmable hardware device, such as an FPGA.

The call initializer 202, the receiver 204 and the responder 206 are depicted in FIG. 2 outside the processor 208. In some embodiments, the call initializer 202, the receiver 204 and the responder 206 are components implemented in hardware circuits. For example, the call initializer 202 includes an interface with the user to initiate the personal call center assistant 102 and may receive and process a signal from the user. In other examples, the receiver 204 includes hardware to receive a query from the call center 106, such as a microphone. In other embodiments, the responder 206 is a component that includes a capability to send a signal to a speaker or to connect with a communication channel to transmit an answer to a query. In at least some embodiments, at least a portion of the call initializer 202, the receiver 204 and the responder 206 are components are implemented in software that directs other hardware to initiate a communication session, to activate the personal call center assistant 102, to receive a query, to send an answer to a query, and the like. One of skill in the art will recognize other ways to implement the components of the personal call center assistant 102.

Figure 3:
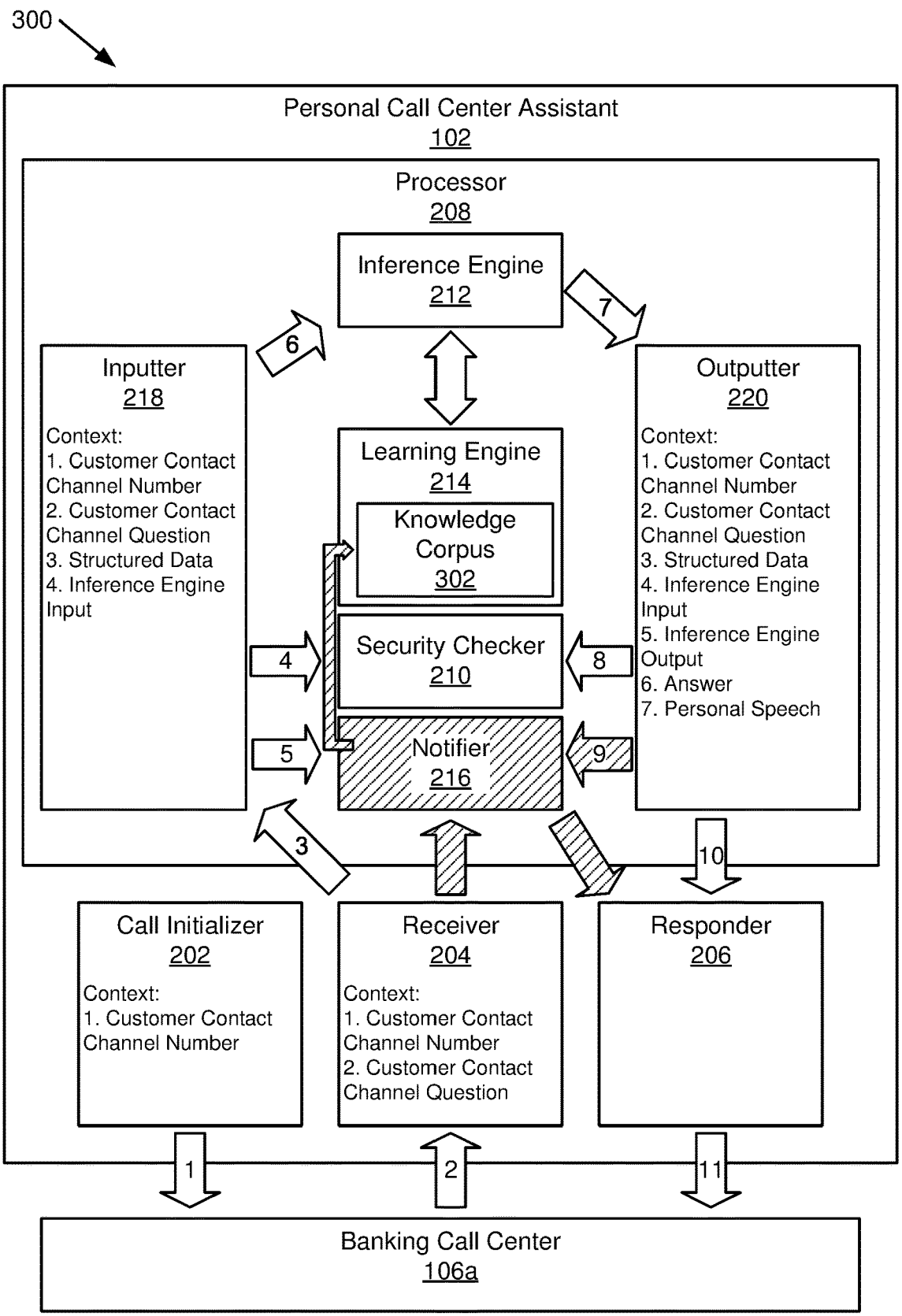
FIG. 3 is a schematic block diagram illustrating one embodiment of an example for use of a personal call center assistant apparatus.

FIG. 3 is a schematic block diagram illustrating one embodiment of an example 300 for use of a personal call center assistant apparatus 200. In the example 300, the call initializer 202 identifies that a phone number for a banking call center 106a is 95558 and that the banking call center 106a will communicate over a speech channel. In step 1 (see numbers in the arrows for the step number), the call initializer 202, in one embodiment, stores the phone number and channel type in the context for the communication session with the banking call center 106a as context ({"from": "95558", "channelType": "speech" }).

In Step 2, the banking call center 106a asks the question "What is your ID card number?" which becomes the query. In step 3, the receiver 204 receives the speech from the banking call center 106a and converts the speech, e.g. the query, to a text question ({"question": "What's your ID card number?"}) and stores the text question in the context for the communication session. In Step 4, the inputter 218 extracts key words as structured data from the query based on the context of the communication session and stores ({"profile": "ID Card Number"}) in the context and by using the security checker 210 to validate if the query is a valid question. The security checker 210 determines that the query is valid, in one embodiment, when the user profile includes "ID Card Number" with all key words in the same order as the structured text. In other embodiments, the security checker 210 determines that the query is valid if there are one or more possible matches with a confidence level above a confidence threshold or other criteria for measuring whether or not the confidence level is sufficient for a particular match between the text of the query and a user profile entry.

In step 5, if the security checker 210 determines that the question is not valid, the notifier 216 prompts the user to respond to the query. In step 6, the inputter 218 generates input for the inference engine 212 and sends the input to the inference engine 212. In one example, the input is ({"inferenceEngineInput": {"key": "95558", "data": {"profile": "ID Card Number"}}). In other embodiments, the input is structured differently. In step 7, the inference engine 212 processes the "Inference Engine Input" based on the knowledge corpus 302 and attaches the output ([{"result": "123456789", "confidence": "100" }, {"result": "12345678", "confidence": "50"}]) into the context of the communication session and sends the output to the outputter 220. Each result is a query response. In some embodiments, the knowledge corpus 302 includes the user profile. In other embodiments, the knowledge corpus 302 includes other information, such as output from a machine learning algorithm, contexts from past communication sessions, etc.

In step 8, the outputter 220 checks each query response to determine if each result is authorized by the user, for example in user's settings. The outputter 220 uses the security checker 210 to determine if each query response is authorized. In some embodiments, if there is at least one query response that is authorized, the outputter 220 moves on to step 10 to continue the process of sending a query response to the banking call center 106a. In other embodiments, if there is at least one query response that is authorized with a confidence level above a confidence threshold, the outputter 220 moves on to step 10. In other embodiments, if the query response has a highest confidence level and is authorized and has a confidence level above a confidence threshold, the outputter 220 moves on to step 10. One of skill in the art will recognize other conditions for the outputter 220 to move on to step 10. If there is not an authorized query response that meets conditions for passing the query response to the call center 106, in step 9 the notifier 216 prompts the user to respond to the query.

If the outputter 220 determines that available query responses don't qualify to continue the process of sending a query response to the banking call center 106a, the outputter 220 alerts the notifier 216 and the notifier 216 prompts the user to provide a query response to the banking call center 106a. In step 10, the outputter 220 selects the query response that is authorized and best matches other conditions, such as highest confidence level, no other authorized query responses with a same confidence level, the query response confidence level above a confidence threshold, etc. In the example 300, the query response selected by the outputter 220 is ({"answer": "123456789"}), which is saved to the context of the communication session. The outputter 220 converts the query response into a format compatible with the communication channel with the banking call center 106a and in line with the context of the query. In the example 300, the communication channel type is speech so the outputter 220 converts the query response to an answer to the query in the form ({"speech": "My ID card is 123456789."}). In step 11, the responder 206 communicates the answer to the banking call center 106a in a speech format. In some embodiments, user input in response to a prompt from the notifier 216 is sent to the responder 206 for communication to the banking call center 106a.

In some embodiments, the learning engine 214 saves the context of the communication session described above as:

```
{
    "from": "95558",
    "channelType":"speech",
    "startTime": "xxxxxxx",
    "endTime": "xxxxxxx",
    "conversations": [
        {
            "question": "What's your ID card number?",
            "structureData": {
                "profile": "ID Card Number"
            },
            "inferenceEngineInput": {
                "key": "95558",
                "data": {
                    "profile": "ID Card Number"
                }
            },
            "inferenceEngineOutput": [
                {
                    "result": "123456789",
                    "confidence": "100"
                },
                {
                    "result": "12345678",
                    "confidence": "50"
                }
            ],
            "answer": "123456789",
            "speech": "My ID card is 123456789."
        }
    ]
}
```

Figure 4:
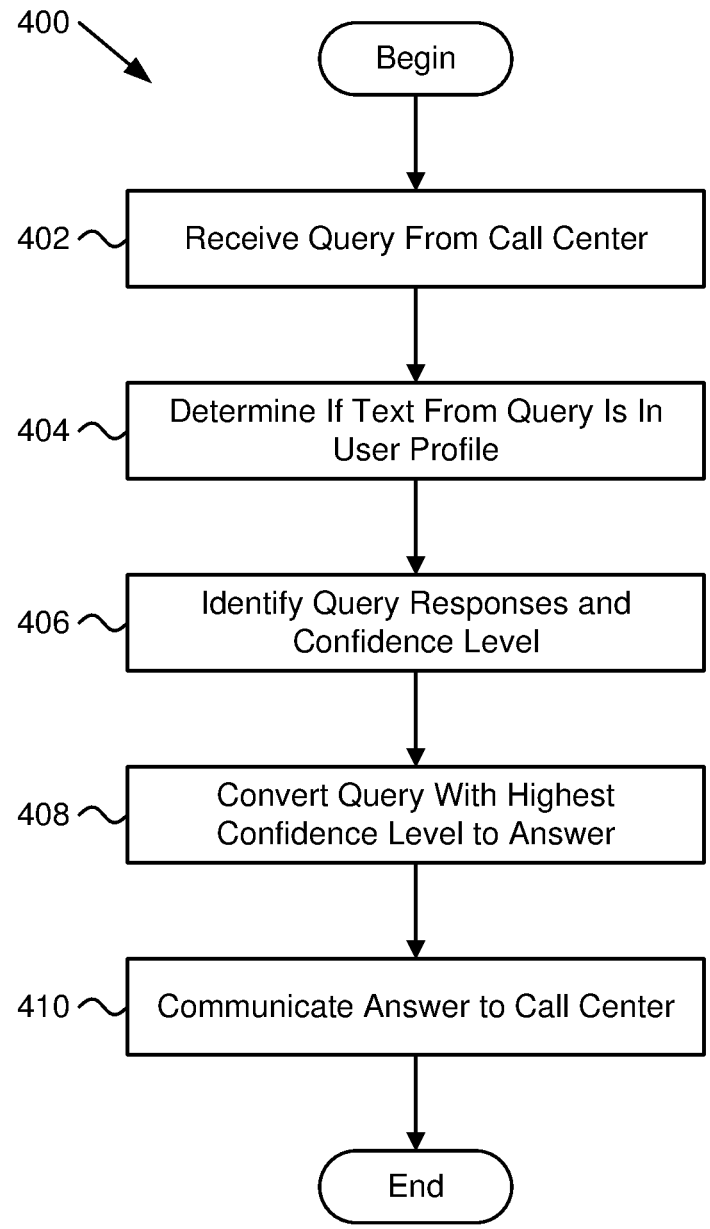
FIG. 4 is a schematic flow chart diagram illustrating one embodiment of a method for a personal call center assistant.

FIG. 4 is a schematic flow chart diagram illustrating one embodiment of a method 400 for a personal call center assistant 102. The method 400 begins and receives 402 a query from a call center 106 over a communication channel during a communication session between the call center 106 and a user. The query is directed to receiving information from the user during the communication session. The method 400 determines 404 whether text from the query matches an entry in a user profile of the user and identifies 406 one or more query responses in response to determining that the text from the query matches an entry in the user profile. Each query response is assigned a confidence level and each confidence level includes a likelihood that the query response matches information requested in the query.

The method 400 converts 408 a query response with a highest confidence level to an answer to the query and communicates 410 the answer to the query to the call center 106 in a format compatible with the query, and the method 400 ends. In various embodiments, the steps of the method 400 are implemented using one or more of the receiver 204, the security checker 210, the inference engine 212, the outputter 220 and the responder 206 of the personal call center assistant 102, and may also be implemented with the learning engine 214 and notifier 216, in certain embodiments.

Figure 5A:
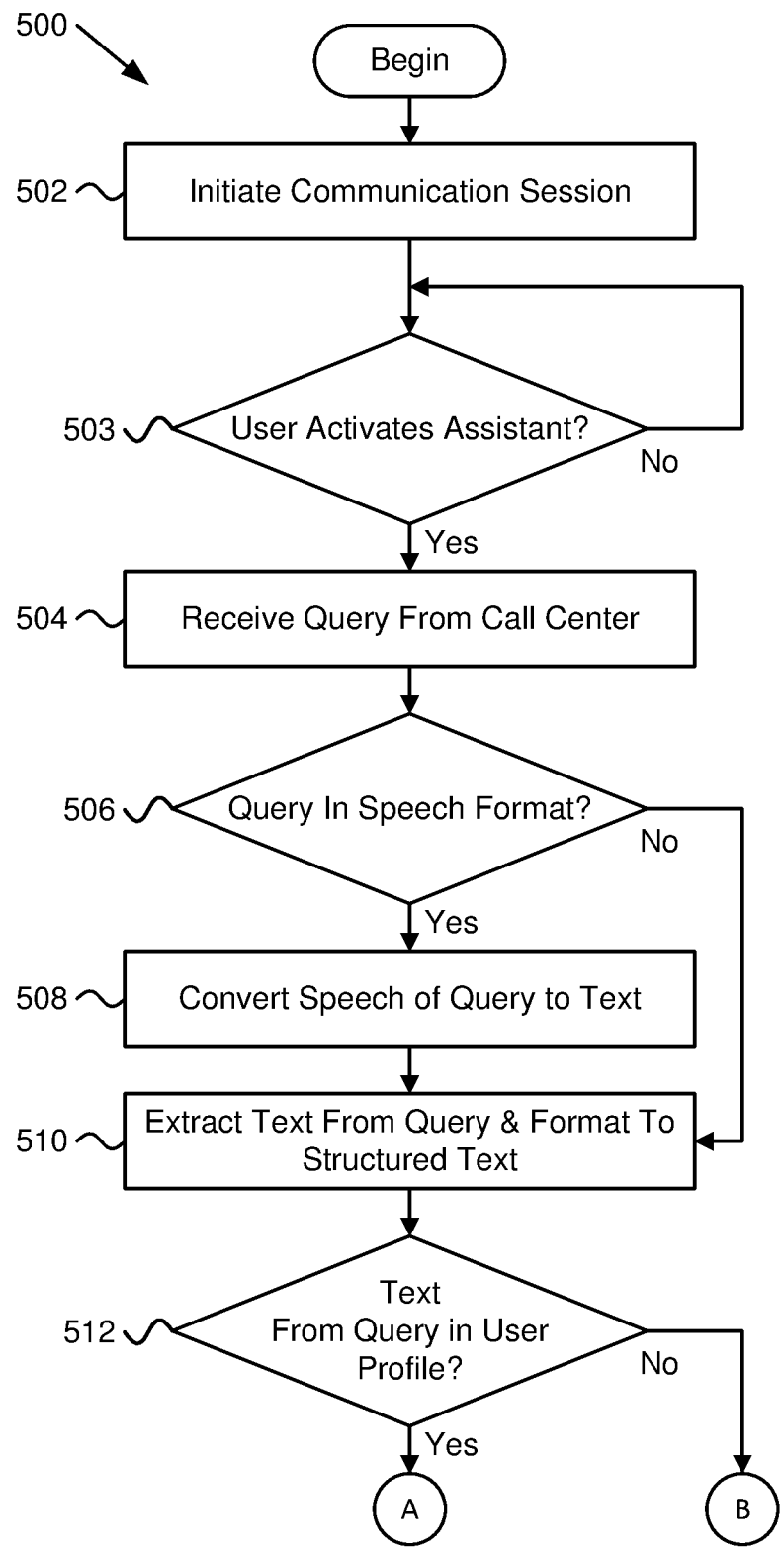
FIG. 5A is a first part of a schematic flow chart diagram illustrating another embodiment of a method for use of a personal call center assistant.
Figure 5B:
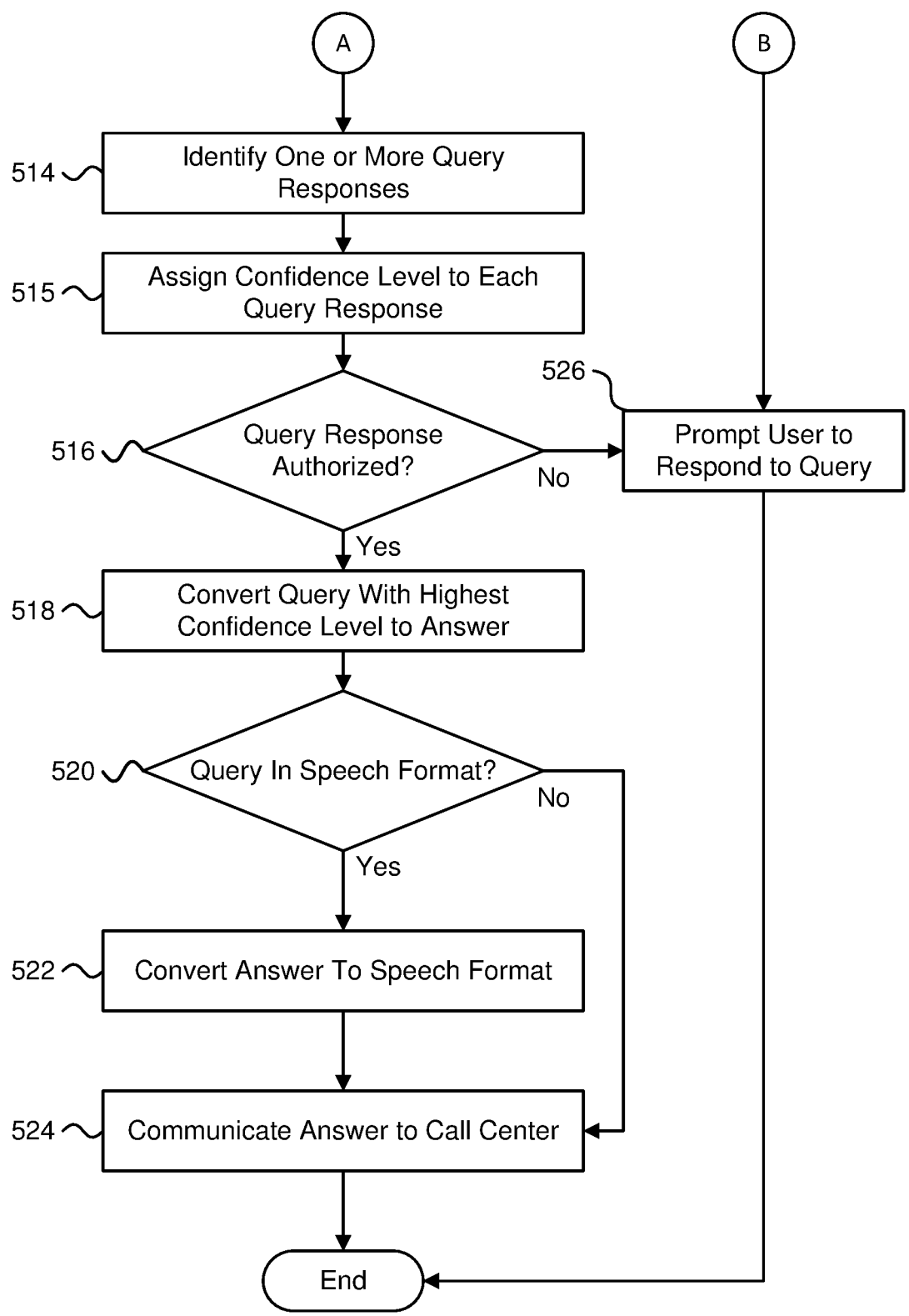
FIG. 5B is a second part of the schematic flow chart diagram of FIG. 5A illustrating the method for use of a personal call center assistant.

FIG. 5A is a first part and FIG. 5B is a second part of a schematic flow chart diagram illustrating another embodiment of a method 500 for use of a personal call center assistant 102. The method 500 begins and initiates 502 a communication session with a call center 106 using a call center identifier. In one embodiment, the call center identifier is a phone number. In another embodiment, the call center identifier is a chat channel identifier used to initiate a chat session with the call center. In another embodiment, the call center identifier is an application identifier, where the user initiates the communication session through the application and the application identifies the call center 106. In some embodiments, the method 500 determines 503 if the user has activated the personal call center assistant 102. In some instances, the user communicates for a period of time with call center 106 before the user is ready for the personal call center assistant 102 to provide information to the call center 106. If the method 500 determines 503 that the use has not activated the personal call center assistant 102, the method 500 returns and again determines 503 if the user has activated the personal call center assistant 102.

If the method 500 determines 503 that the user has activated the personal call center assistant 102, the method 500 receives 504 a query from a call center 106 over a communication channel during a communication session between the call center and the user. The query is directed to receiving information from the user during the communication session. The method 500 determines 506 whether the communication session is in a speech format (e.g. a phone call). If the method 500 determines 506 the communication session is in a speech format and the query is communicated as a voice query, the method 500 converts 508 the voice query to text. In some embodiments, the text is in an unstructured format and the method 500 extracts 510 key words from the query and formats the query into structured text compatible with searching a user profile of the user for the structured text to determine if the text from the query matches an entry in the user profile. If the method 500 determines 506 the communication session is not in a speech format (e.g. is text from a chat session rather than a phone call) and the query is communicated as a text query, the method 500 extracts 510 key words from the query and formats the query into structured text.

The method 500 determines 512 whether text from the query matches an entry in a user profile of the user. If the method 500 determines 512 that text from the query matches an entry in a user profile of the user, the method 500 identifies 514 one or more query responses (follow "A" from FIG. 5A to "A" on FIG. 5B). The method 500 assigns 515 each query response a confidence level where each confidence level includes a likelihood that the query response matches information requested in the query.

The method 500 determines 516 if each query response is authorized by the user. If the method 500 determines 516 that a query response with a highest confidence level is authorized by the user, the method 500 converts 518 the query with the highest confidence level to an answer to the query and determines 520 if the query is in a speech format. If the method 500 determines 520 that the query is in a speech format, the method 500 converts 522 the answer to a speech format and communicates 524 the answer to the call center 106, and the method 500 ends. If the method 500 determines 520 that the query is not in a speech format (e.g. the query is in a text format), the method 500 communicates 524 the answer to the call center 106, and the method 500 ends.

If the method 500 determines 512 that text from the query does not match an entry in a user profile of the user, the method 500 prompts 526 the user to respond to the query (follow "B" from FIG. 5A to "B" on FIG. 5B), and the method 500 ends. If the method 500 determines 516 that a query response with a highest confidence level is not authorized by the user, the method 500 prompts 526 the user to respond to the query, and the method 500 ends. In some embodiments, the method 500 uses an authorized query response with a next highest confidence level above a confidence threshold if the method 500 determines 516 that the query response with the highest confidence level is not authorized. In other embodiments, the method 500 uses other conditions to determine if an appropriate query response should be sent to the call center 106 and uses conditions, such as the query response is authorized, the query response is above a confidence threshold, etc. In other embodiments, instead of the method 500 ending, the method 500 may return to receive 504 one or more queries from the call center 106 and may iterate through the queries using the method 500 as described above. One of skill in the art will recognize other variations of the method 500 to continue and ultimately conclude a communication session with the call center 106. In various embodiments, the steps of the method 500 may be practiced by one or more of the call initializer 202, the receiver 204, the responder 206, the security checker 210, the inference engine 212, the learning engine 214, the notifier 216, the inputter 218 and the outputter 220.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a receiver that receives a query from a call center over a communication channel during a communication session between the call center and a user, the query directed to receiving information from the user during the communication session, wherein the query from the call center is in a same format as the user initiated the communication session;
   a security checker that determines whether text from the query matches an entry in a user profile of the user;
   an inference engine that identifies one or more query responses in response to the security checker determining that the text from the query matches an entry in the user profile, each query response assigned a confidence level, each confidence level comprising a likelihood that the query response matches information requested in the query;
   an outputter that converts a query response with a highest confidence level to an answer to the query; and
   a responder that communicates the answer to the query to the call center in a format compatible with the query, and
   wherein the receiver, the security checker, the inference engine, the outputter and the responder comprise hardware circuits, a programmable hardware device and/or executable code stored on non-transitory computer readable storage media.

2. The apparatus of claim 1, further comprising a notifier that prompts the user to respond to the query in response to the security checker determining that text from the query does not match an entry in the user profile, wherein the notifier comprises hardware circuits, a programmable hardware device and/or executable code stored on non-transitory computer readable storage media.

3. The apparatus of claim 1, wherein the security checker further determines if each of the one or more query responses is authorized and wherein the outputter converts a query response with a highest confidence level and that is authorized to an answer to the query.

4. The apparatus of claim 3, further comprising a notifier that prompts the user to respond to the query in response to the security checker determining that a query response with a highest confidence level is not authorized, wherein the notifier comprises hardware circuits, a programmable hardware device and/or executable code stored on non-transitory computer readable storage media.

5. The apparatus of claim 3, further comprising a notifier that prompts the user to respond to the query in response to one or more of:
the confidence level for each of the one or more query responses being below a confidence threshold; and
the confidence level for two or more query responses being equal and being higher than the confidence level of other query responses,
wherein the notifier comprises hardware circuits, a programmable hardware device and/or executable code stored on non-transitory computer readable storage media.

6. The apparatus of claim 1, wherein the communication session is a phone call and the query is communicated to the receiver as a voice query and the receiver converts the voice query to text and wherein the outputter converts the query response to an answer that is a voice answer.

7. The apparatus of claim 1, wherein the communication session is a chat session and the query is communicated to the receiver as a text query and wherein the outputter converts the query response to an answer that is a text answer.

8. The apparatus of claim 1, further comprising a learning engine that stores information from the communication session and uses machine learning to use information from one or more past communication sessions one or more of to identify a call center participating in the communication session, to update the user profile and to determine whether a query response is authorized by the user, wherein the learning engine comprises hardware circuits, a programmable hardware device and/or executable code stored on non-transitory computer readable storage media.

9. The apparatus of claim 1, wherein the query received from the receiver is in an unstructured format and further comprising an inputter that extracts key words from the query and formats the query into structured text compatible with the security checker searching the user profile for the structured text to determine if the text from the query matches an entry in the user profile.

10. The apparatus of claim 1, further comprising a call initializer that initiates the communication session with the call center using a call center identifier, wherein the call center identifier comprises one or more of:
a phone number of the call center;
a chat channel identifier used to initiate a chat session with the call center; and
an application identifier, wherein the user initiates the communication session through an application associated with the application identifier and the application identifies the call center,
wherein the call initiator comprises hardware circuits, a programmable hardware device and/or executable code stored on non-transitory computer readable storage media.

11. The apparatus of claim 1, wherein the query requests personal information from the user and the answer to the query comprises personal information requested in the query.

12. A computer-implemented method comprising:
receiving a query from a call center over a communication channel during a communication session between the call center and a user, the query directed to receiving information from the user during the communication session, wherein the query from the call center is in a same format as the user initiated the communication session;
determining whether text from the query matches an entry in a user profile of the user;
identifying one or more query responses in response to determining that the text from the query matches an entry in the user profile, each query response assigned a confidence level, each confidence level comprising a likelihood that the query response matches information requested in the query;
converting a query response with a highest confidence level to an answer to the query; and
communicating the answer to the query to the call center in a format compatible with the query.

13. The computer-implemented method of claim 12, further comprising prompting the user to respond to the query in response to determining that text from the query does not match an entry in the user profile.

14. The computer-implemented method of claim 12, further comprising determining if each of the one or more query responses is authorized and wherein converting a query response with a highest confidence level to an answer to the query comprises converting a query response with a highest confidence level and that is authorized to an answer to the query.

15. The computer-implemented method of claim 14, further comprising prompting the user to respond to the query in response to determining that a query response with a highest confidence level is not authorized.

16. The computer-implemented method of claim 12, wherein the query received from the receiver is in an unstructured format and further comprising extracting key words from the query and formatting the query into structured text compatible with searching the user profile for the structured text to determine if the text from the query matches an entry in the user profile.

17. The computer-implemented method of claim 12, further comprising prompting the user to respond to the query in response to one or more of:
the confidence level for each of the one or more query responses being below a confidence threshold; and
the confidence level for two or more query responses being equal and being higher than the confidence level of other query responses.

18. The computer-implemented method of claim 12, wherein one of:
the communication session is a phone call and the query is communicated as a voice query and further comprising converting the voice query to text and converting the query response to an answer that is a voice answer; and
the communication session is a chat session and the query is communicated as a text query and further comprising converting the query response to an answer that is a text answer.

19. The computer-implemented method of claim 12, further comprising storing information from the communication session and using machine learning to use information from one or more past communication sessions one or more of to identify a call center participating in the communication session, to update the user profile and to determine whether a query response is authorized by the user.

20. A computer program product comprising a computer readable storage medium having program instructions embodied therewith, the program instructions executable by a processor to cause the processor to:
- receive a query from a call center over a communication channel during a communication session between the call center and a user, the query directed to receiving information from the user during the communication session, wherein the query from the call center is in a same format as the user initiated the communication session;
- determine whether text from the query matches an entry in a user profile of the user;
- identify one or more query responses in response to determining that the text from the query matches an entry in the user profile, each query response assigned a confidence level, each confidence level comprising a likelihood that the query response matches information requested in the query;
- convert a query response with a highest confidence level to an answer to the query; and
- communicate the answer to the query to the call center in a format compatible with the query.

* * * * *